United States Patent [19]

Kelly

[11] 4,316,623
[45] Feb. 23, 1982

[54] SELF-PRESSURIZABLE PORTABLE VESSEL WITH FAUCET CONNECTOR

[76] Inventor: Quentin T. Kelly, R.D. #1, Box #4, Hopewell, N.J. 08525

[21] Appl. No.: 95,594

[22] Filed: Nov. 19, 1979

[51] Int. Cl.³ .............................................. B65D 37/00
[52] U.S. Cl. ...................................... 285/8; 222/210; 222/212; 141/383
[58] Field of Search ............... 141/383, 311 R; 285/8, 285/423; 222/105, 212, 215, 386.5, 210

[56] References Cited

U.S. PATENT DOCUMENTS

| | | | |
|---|---|---|---|
| 1,940,210 | 12/1933 | Frederick | 285/8 X |
| 1,984,347 | 12/1934 | Sutton et al. | 285/8 |
| 2,085,841 | 7/1937 | Weiss | 285/8 |
| 2,426,303 | 8/1947 | Graber | 285/8 X |
| 2,493,577 | 1/1950 | Franklin | 285/8 |
| 2,973,974 | 3/1961 | Disney | 285/8 |
| 3,895,742 | 7/1975 | Walbern | 222/105 |

Primary Examiner—David A. Scherbel
Attorney, Agent, or Firm—Richard C. Woodbridge

[57] ABSTRACT

A hose-mounted faucet-connector having an integral inner and outer housing, the outer housing at one end being connectable to a hose and at the mounting end having the inner housing integrally mounted across the remaining other mounting end sealably thereof except for a mounting aperture centrally within the body of the inner housing that extends concavely within space of the outer housing, the inner walls of the outer housing including spaced-apart ribs extending substantially axially of tubular space from the one end to the integral inner housing at the mounting end of the outer housing; in a preferred embodiment, the faucet mount is mounted on a valve-containing hose that is mounted on an inlet-outlet structure of the pressurizable vessel.

2 Claims, 3 Drawing Figures

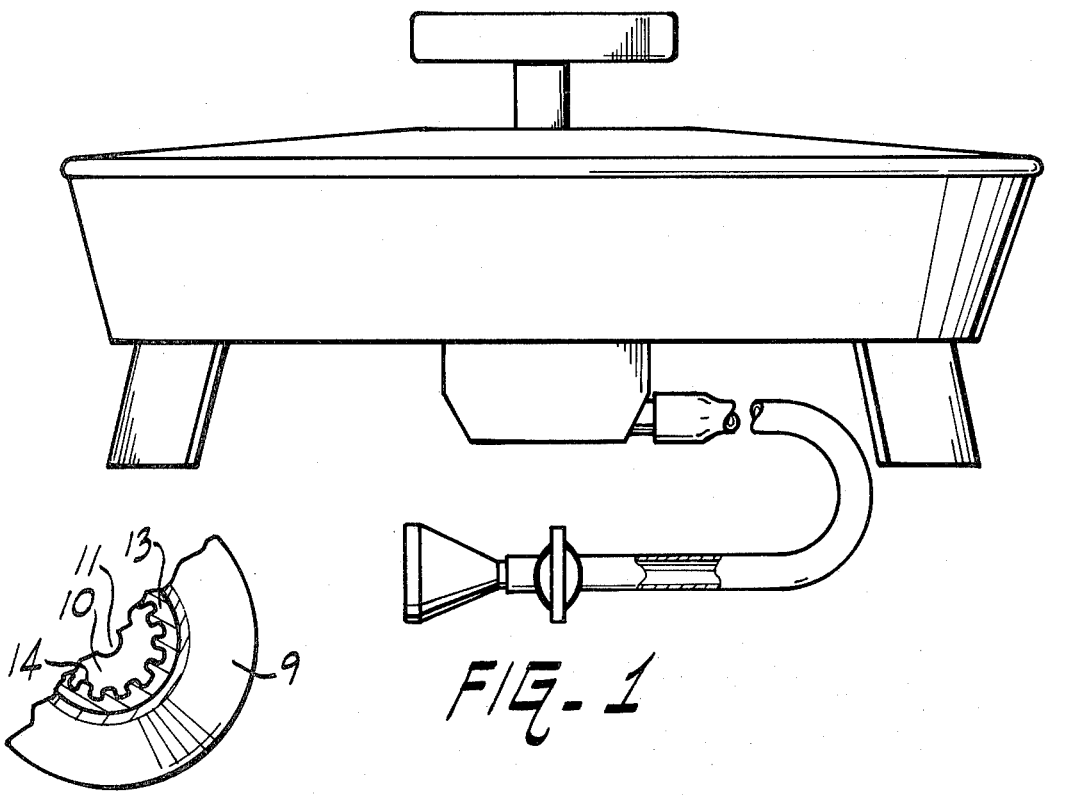
FIG. 3
FIG. 1
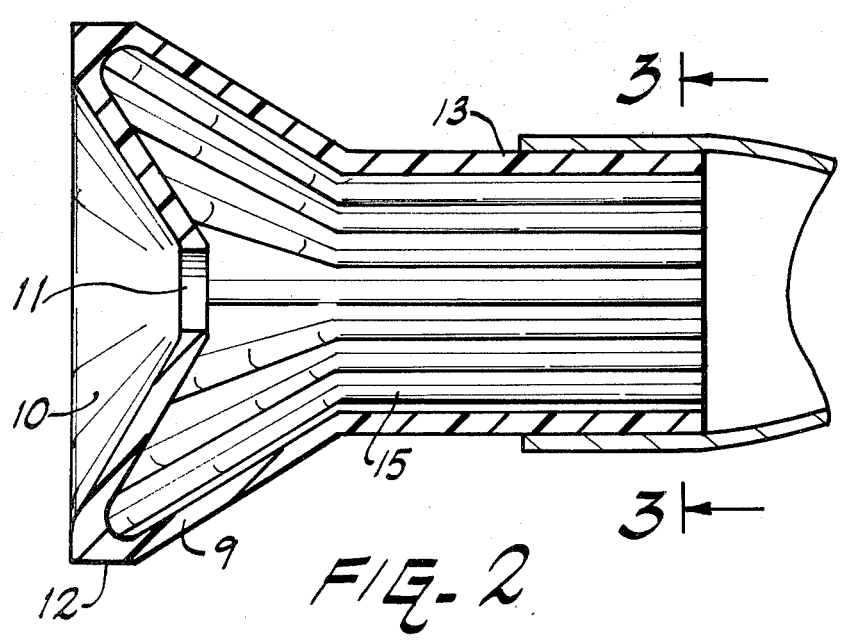
FIG. 2

SELF-PRESSURIZABLE PORTABLE VESSEL WITH FAUCET CONNECTOR

This invention relates to a faucet connector as a part of a self-pressurizable portable vessel.

BACKGROUND TO THE INVENTION

Prior to the present invention, somewhat analagous self-pressurized portable containers have been the subject matter of the U.S. Pat. No. 3,895,742 to Wulbern, and U.S. Pat. No. 3,989,170 and 3,929,262 and 3,880,323 to Viehe. FIG. 3 of the U.S. Pat. No. 3,895,742 most nearly is typical of existing prior art faucet connectors characterizing problems toward which the present invention is directed. One such problem was the fact of too much flexibility and collapse of the connector, buckling when an effort was made to force it onto a faucet outlet such as a spigot. Another problem arose from the failure of the faucet connector to hold onto the spigot when the water was turned-on, the pressure of the water in the faucet connector and in the hose and expanding self-pressurizable vessel's elastic membrane, resulting in the faucet connector merely losing its grip and thusly popping-off of the faucet, accidentally far too often. Also, these vessel combinations are commercially necessarily low-cost in order to be attractive and competitive in the commercial market place; thus, simple and inexpensive remedy was necessary in order to be acceptable and practical. Expensive or bulky faucet fasteners were thus ruled-out. Also, the connector had to be aesthetically attractive, rather than some unsightly structure. And most important, because the present combination is to be used by non-mechanically minded persons, the connector had to be simple to mount, and such that quick and easy mounting is possible. The achieving of so many requirements simultaneously posed considerable problems to be overcome.

SUMMARY OF THE INVENTION

Objects of the present invention include the overcoming and/or avoiding of problems and difficulties of the types discussed above, together with the achieving of novel results described herein.

A particular object is to obtain a faucet-connector that does not leak nor baloon and pop-off, and which exhibits sufficient body firmness as to be easily mountable by a person's hand pressing the same onto a spigot outlet.

Another object is to achieve the above objects at a low cost of production and by simple structure and mechanism.

Other objects become apparent from the preceding and following disclosure.

One or more objects of the invention are obtained by the invention as typically illustrated as to preferred embodiments thereof by the accompanying figures which are not intended to unduly limit the scope of the invention, but are intended only to improve understanding of the invention.

Broadly the invention may be described as a faucet-connector unit having integrally molded outer and inner housings, the inner housing being concavely mounted within the mounting end of the outer housing at the wider end of the outer housing, and the wall of the outer housing being of substantially uniform thickness, along a length extending between the mounting end and the hose-mounting end thereof, with a faucet-mounting aperture located in the wall of the inner housing and outer peripheries of the inner housing integrally mounted in the faucet-mounting larger end of the outer housing; the improvement comprises the presence of a plurality of spaced-apart ribs integral with and extending along an inner surface of the outer housing extending between the hose-mounting end and the enlarged faucet-mounting end of the outer housing up to the inner housing wall. By virtue of these ribs, the faucet mounting unit is rendered sturdy enabling it to be easily pushed onto a faucet spigot structure, and enabling a firm grip, with the unit being firm against any tendency to baloon or pop-off. It is a simple structure, easy to manufacture and at low cost, and has acceptable aesthetic appearance.

In the preferred embodiment, the faucet connector is composed of polyvinylchloride plastic of a soft flexible nature, enabling the connector to flex and snugly fit the faucet on which it is mounted removably by pushing thereonto.

The faucet connector is preferably mounted on a valve for flow control into and out of a hose which is sealably mounted on inlet-outlet structure of the self-pressurizable container having an elastic expandable membrane mounted on a base plate.

Preferably the faucet-mounting aperture is substantially centrally located in the inner housing, for best mounting function.

Other variations are within the spirit of the invention.

In so far as the present invention pertains to the prior art vessels of the types of the above-noted patents, the entire disclosure of these patents is incorporated by reference hereinto this disclosure.

The following drawings are intended to illustrate the above-noted improved features of the invention.

THE FIGURES

FIG. 1 illustrates a typical side perspective view of the present invention.

FIG. 2 illustrates a side cross-sectional view of the faucet connector of the invention.

FIG. 3 is a partial cross-section taken along line 3—3 of FIG. 2.

DETAILED DESCRIPTION

FIG. 1 illustrates the overall combination of the self-pressurizable unit 3 having an expandable elastic membrane 4 mounted on a base plate 5 from which a hose 6 extends. The hose 6 has at an end thereof a valve 7 onto which the faucet connector 8 is connected. The faucet connector is shown in side cross-sectional view in FIG. 2, including an outside housing 9 and an inside housing 10 with a centrally-located faucet-mounting aperture 11. Peripheries of the inside housing 10 are integrally molded with the enlarged end of the outside housing at enlarged end 12. The integral ribs 15 are integral with an inside surface of the outside housing 9, and the ribs 15 extend from the narrower tube-mounting end 13 having opening 14, with the ribs extending axially from the opening 14 to the inner housing 10. The plurality of ribs 15 are in spaced-apart relationship, substantially as shown. The walls of the outer housing 9 are relatively thin and flexible and of uniform thickness as shown throughout the length from end 12 to end 13. Both the inner and the outer housings are each composed of polyvinylchloride plastic of conventional type well known in the art, of a flexible soft type. Accordingly, except as utilized in this invention, the exact nature of the composition and method of making the polyvinylchloride plastic does not constitute a part of the present invention.

It is within the scope of the present invention to make such modifications and variations and substitution of equivalents as would be apparent to a person of ordinary skill in this art.

I claim:

1. A hose faucet-connector comprising in combination: an integrally molded unit having an outer housing of wall structure forming a tubular through-space extending from a first open end to a second open end, being substantially wider in outside diameter at said first open end as compared to outside diameter at said second open end and having substantially uniform thickness of the wall structure throughout a length of said outer housing between said first open end and said second open end, and said molded unit having further a concavely shaped inner housing with at-least a faucet-mounting aperture with said inner housing extending across said first end and sealably fused therewith at outer peripheries of said inner housing, the improvement comprising spaced-apart ribs extending, independent of other support, along an inner surface of said outerhousing integral with solely said wall structure, with the ribs extending substantially in an axial direction relative to said tubular through-space ranging up to said outer peripheries of said inner housing, said outer housing and tubular space thereof at said first open end being substantially flared outwardly in shape and said concavely shaped inner housing being inwardly free of support by said spaced-apart ribs, free-space of the tubular space existing between the concavely shaped inner housing and said spaced-apart ribs, and said wall structure at locations between said spaced-apart ribs being sufficiently thin as to be flexible in nature, whereby said spaced-apart ribs render a sturdy structure axially of said tubular through-space when mounting the unit on a faucet and firm against tendencies to baloon or pop-off when elevated water pressure exists during water-flow from a faucet on which the unit is mounted through said faucet-mounting aperture.

2. A hose faucet-connector of claim 1, in which said molded unit comprises substantially polyvinylchloride plastic.

* * * * *